US009519485B2

(12) United States Patent
Busaba et al.

(10) Patent No.: US 9,519,485 B2
(45) Date of Patent: Dec. 13, 2016

(54) CONFIDENCE THRESHOLD-BASED OPPOSING BRANCH PATH EXECUTION FOR BRANCH PREDICTION

(71) Applicant: International Business Machines Corporation, Armonk, NY (US)

(72) Inventors: Fadi Y. Busaba, Poughkeepsie, NY (US); Steven R. Carlough, Poughkeepsie, NY (US); Christopher A. Krygowski, Lagrangeville, NY (US); Brian R. Prasky, Wappingers Falls, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 14/501,452

(22) Filed: Sep. 30, 2014

(65) Prior Publication Data

US 2015/0058607 A1     Feb. 26, 2015

Related U.S. Application Data

(63) Continuation of application No. 13/741,597, filed on Jan. 15, 2013, now Pat. No. 9,348,599.

(51) Int. Cl.
*G06F 9/38* (2006.01)

(52) U.S. Cl.
CPC .............. *G06F 9/3844* (2013.01); *G06F 9/38* (2013.01); *G06F 9/3804* (2013.01); *G06F 9/3851* (2013.01)

(58) Field of Classification Search
CPC ..... G06F 9/3804; G06F 9/3844; G06F 9/3851
See application file for complete search history.

(56) References Cited

U.S. PATENT DOCUMENTS

| 6,029,228 A | 2/2000 | Cai et al. |
| 6,560,693 B1 | 5/2003 | Puzak et al. |

(Continued)

FOREIGN PATENT DOCUMENTS

| CN | 101515231 A | 8/2009 |
| CN | 101587434 A | 11/2009 |
| WO | 2014111758 A1 | 7/2014 |

OTHER PUBLICATIONS

Notification of Transmittal of the International Search Report and the Written Opinion of the International Searching Authority, or the Declaration; Mail date Apr. 25, 2014 for International Application No. PCT/IB2013/059500; International Filing Date: 2.

(Continued)

*Primary Examiner* — Benjamin Geib
(74) *Attorney, Agent, or Firm* — Stosch Sabo

(57) ABSTRACT

Embodiments relate to confidence threshold-based opposing path execution for branch prediction. An aspect includes determining a branch prediction for a first branch instruction that is encountered during execution of a first thread, wherein the branch prediction indicates a primary path and an opposing path for the first branch instruction. Another aspect includes executing the primary path by the first thread. Another aspect includes determining a confidence of the branch prediction and comparing the confidence of the branch prediction to a confidence threshold. Yet another aspect includes, based on the confidence of the branch prediction being less than the confidence threshold, starting a second thread that executes the opposing path of the first branch instruction, wherein the second thread is executed in parallel with the first thread.

6 Claims, 8 Drawing Sheets

(56) References Cited

U.S. PATENT DOCUMENTS

| | | |
|---|---|---|
| 6,625,744 B1 * | 9/2003 | Rappoport ............ G06F 9/3844 |
| | | 712/E9.051 |
| 6,886,093 B2 | 4/2005 | Henry et al. |
| 7,051,192 B2 | 5/2006 | Chaudhry et al. |
| 7,472,263 B2 | 12/2008 | Yokoi |
| 7,673,122 B1 | 3/2010 | Song et al. |
| 7,930,695 B2 | 4/2011 | Chaudhry et al. |
| 2005/0223203 A1 | 10/2005 | Loh |
| 2005/0235170 A1 | 10/2005 | Atkinson |
| 2006/0168432 A1 | 7/2006 | Caprioli et al. |
| 2007/0288731 A1 | 12/2007 | Bradford et al. |
| 2008/0109668 A1 | 5/2008 | Atkinson et al. |
| 2009/0172303 A1 | 7/2009 | Welc et al. |
| 2010/0162247 A1 | 6/2010 | Welc et al. |
| 2010/0306506 A1 | 12/2010 | Hooker et al. |
| 2011/0246993 A1 | 10/2011 | Moir et al. |
| 2014/0122836 A1 | 5/2014 | Gschwind |

OTHER PUBLICATIONS

Porter et al., "Mapping Out a Path from Hardware Transactional Memory to Speculative Multithreading," In Proceedings of the 18th International Conference on Parallel Architectures and Compilation Techniques; PACT 2009; 12 pages.

* cited by examiner

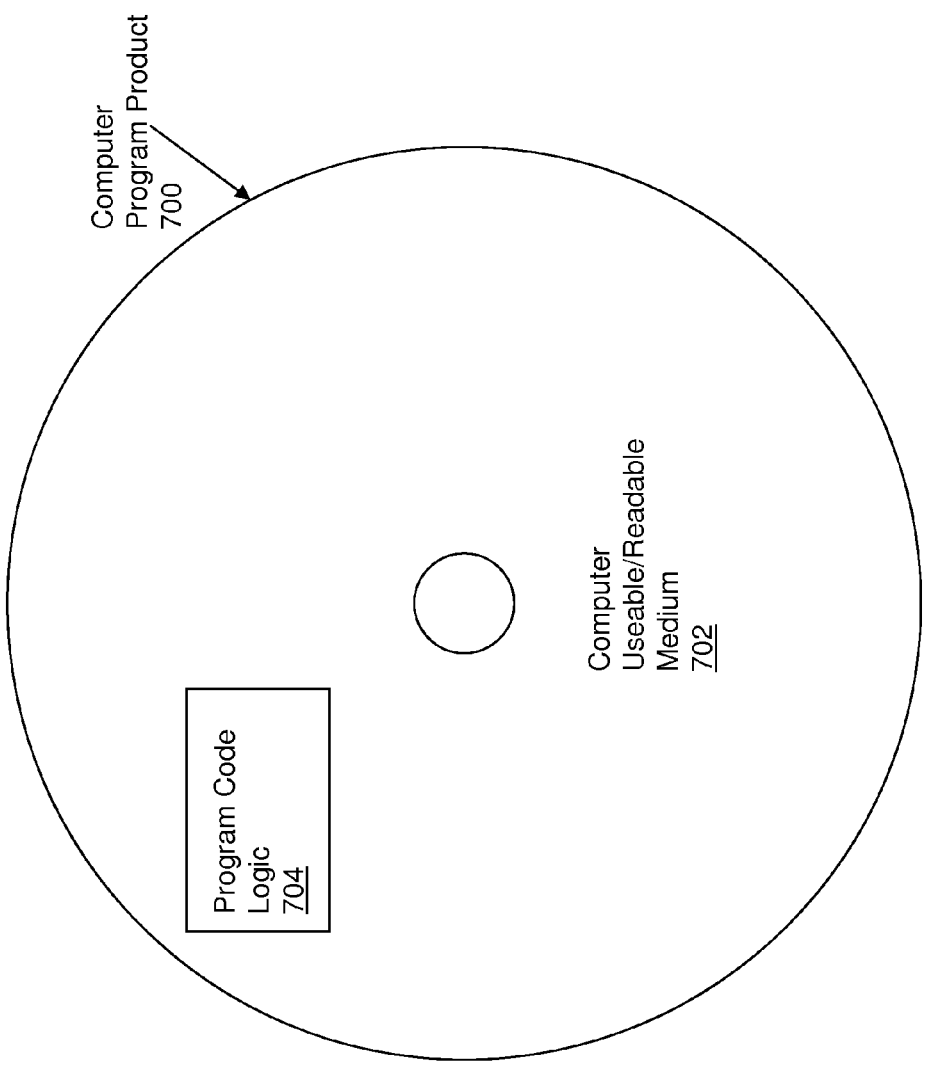

CONFIDENCE THRESHOLD-BASED OPPOSING BRANCH PATH EXECUTION FOR BRANCH PREDICTION

CROSS-REFERENCE TO RELATED APPLICATION

This application is a continuation of U.S. application Ser. No. 13/741,597 (Busaba et al.), filed on Jan. 15, 2013, which is herein incorporated by reference in its entirety.

BACKGROUND

The present invention relates generally to branch prediction in a computer processor, and more specifically, to confidence threshold-based opposing path execution for branch prediction.

A processor in a computer system may process an instruction by executing the instruction in a series of small steps, or operations. In some cases, to increase the number of instructions being processed by the processor, and therefore increase the speed of the processor, the processor may be pipelined. Pipelining refers to providing separate stages in a processor, wherein each stage performs one or more of the small steps necessary to execute an instruction. As an example of executing instructions in a pipeline, when a first instruction is received, a first pipeline stage may process a small part of the instruction. When the first pipeline stage has finished processing the small part of the instruction, a second pipeline stage may begin processing another small part of the first instruction while the first pipeline stage receives and begins processing a small part of a second instruction. Thus, the processor may process two or more instructions at the same time in parallel.

A computer program may include branch instructions, which cause the computer program to branch from one instruction to a target instruction (thereby skipping sequential instructions, if any) if a condition defined by the branch instruction is satisfied. If the condition is not satisfied, the next instruction sequentially after the branch instruction may be executed without branching to the target instruction. Typically, the outcome of the condition being tested is not known until the branch instruction is executed and its condition is tested. Thus, the correct next instruction to be executed after the branch instruction may not be known until the condition is tested.

Where a pipeline is utilized to execute instructions, the outcome of the branch instruction may not be known until branch resolution, after the branch instruction has passed through several stages of the pipeline. Thus, the correct next instruction to be executed after the branch instruction may not be known until the branch instruction has passed through the stages necessary to determine the outcome of the condition. In some cases, execution of instructions in the pipeline may be stalled (e.g., the stages of the pipeline preceding the branch instruction may not be used to execute instructions) until branch resolution. When the pipeline is stalled, the pipeline is not being used to execute as many instructions in parallel, decreasing overall processor efficiency.

In other cases, to improve processor efficiency, branch prediction may be used to predict the outcome of branch instructions. For example, when a branch instruction is encountered, the processor may predict which instruction, or path, will be executed after the outcome of the condition is known. Then, instead of stalling the pipeline when the branch instruction is issued, the processor may continue issuing instructions beginning with the predicted next instruction. The predicted path of a branch instruction may be referred to as the primary path, and the non-predicted path may be referred to as the opposing path.

However, in some cases, the branch prediction may be incorrect (e.g., the processor may predict one outcome of the branch instruction, but at branch resolution, the opposite outcome results). When the outcome of the branch instruction is mispredicted, the predicted instructions that were issued to the pipeline based on the branch prediction may be removed from the pipeline and the effects, which were to be checkpointed, of those instructions are undone. This is referred to as flushing the pipeline. Then, after the pipeline is flushed, the correct next instruction, corresponding to the opposing path, for the branch instruction may be issued to the pipeline and execution of the instructions may continue. When the outcome of a branch instruction is incorrectly predicted and the incorrectly predicted group of instructions corresponding to the primary path is flushed from the pipeline, thereby undoing previous work done by the pipeline, the efficiency of the processor may suffer.

SUMMARY

Embodiments include a method and computer program product for confidence threshold-based opposing path execution for branch prediction. An aspect includes determining a branch prediction for a first branch instruction that is encountered during execution of a first thread, wherein the branch prediction indicates a primary path and an opposing path for the first branch instruction. Another aspect includes executing the primary path by the first thread. Another aspect includes determining a confidence of the branch prediction and comparing the confidence of the branch prediction to a confidence threshold. Yet another aspect includes, based on the confidence of the branch prediction being less than the confidence threshold, starting a second thread that executes the opposing path of the first branch instruction, wherein the second thread is executed in parallel with the first thread.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 7 illustrates a computer program product in accordance with an embodiment.

DETAILED DESCRIPTION

Embodiments of systems and methods for confidence threshold-based opposing path execution for branch prediction are provided, with exemplary embodiments being discussed below in detail. A branch instruction may be predicted with a high confidence or low confidence. The level of confidence may be determined based on a confidence threshold that is defined in the processor. For a branch instruction that is predicted with low confidence, both the predicted path (i.e., the primary path) and the non-predicted path (i.e., the opposing path) may be executed in parallel as two separate threads corresponding to the program that includes the branch instruction. At resolution of the branch instruction's condition, when the correct path is determined, the thread corresponding to the correct path may continue execution as the main thread for the program, while the thread corresponding to the incorrect path may be aborted. If the opposing path thread is determined to be the correct path, the opposing path thread replaces the aborted primary path thread as the main thread for the program. Counters that track correct and incorrect branch predictions may be maintained for each branch instruction in a branch target buffer/branch history table (BTB/BHT) in order to allow relatively accurate determination of prediction confidence.

The processor may comprise a simultaneous multi-threaded (SMT) processor that is capable of executing multiple threads in parallel. An SMT processor may have a set maximum number of threads that may be handled by the SMT processor at once. The processor may additionally comprise transactional memory resources. Transactional memory allows a set of instructions to be defined as a transaction, and the results of execution of the transaction may be stored in transactional memory instead of in the cache storage of the processor. If a transaction is aborted, the processor may rewind the set of instructions comprising the transaction to the start of the transaction by invalidating and leaving the results of the transaction in the transactional memory. If the transaction is successfully completed, the results of the transaction may be committed, i.e., transferred from the transactional memory into cache storage. A thread corresponding to an opposing path of a branch instruction may be run as a transaction using the transactional memory resources. Therefore, if the thread corresponding to the opposing path is determined to be the incorrect path at branch resolution, the results of the opposing path thread may be rewound when the opposing path thread is aborted. On the other hand, if the opposing path thread is determined to be the correct path at branch resolution, the transaction will be ended and the operations performed by the opposing path thread may be committed from the transactional memory into cache storage.

Figure 1:
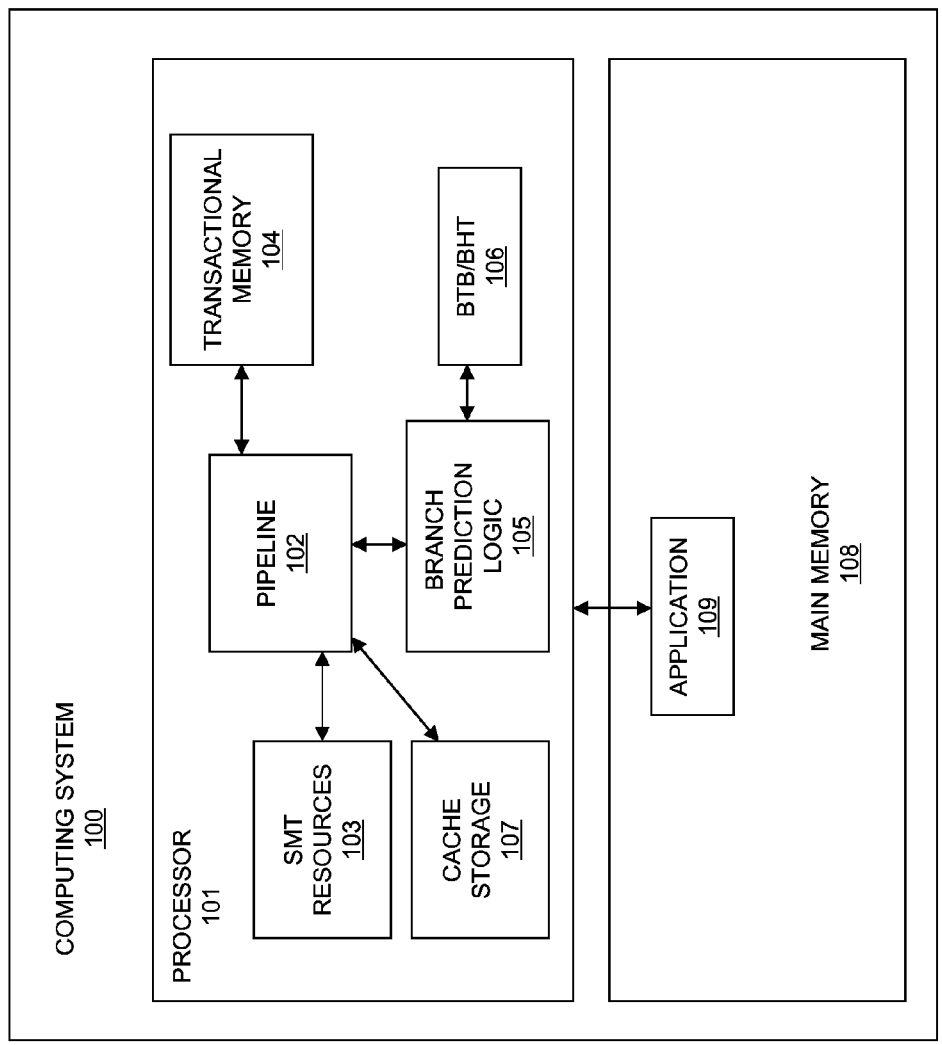
FIG. 1 depicts a computer system for confidence threshold-based opposing path execution for branch prediction in accordance with an embodiment.

FIG. 1 shows an illustrative embodiment of a computing system 100 for confidence threshold-based opposing path execution for branch prediction. The computing system 100 includes a processor 101 with a pipeline 102. The processor 101 is in communication with a main memory 108 of the computing system 100, and instructions issued during execution of computer programs, such as application 109, are processed by pipeline 102. The processor 101 is an SMT processor that is capable of running multiple threads simultaneously in parallel using SMT resources 103. The processor 101 additionally includes transactional memory 104. For sets of instructions that are defined as a transaction, the results of all operations performed by the transaction may be stored in the transactional memory 104 until the transaction is committed, at which point the results of the transaction may be transferred from the transactional memory 104 into cache storage 107. Cache storage 107 may comprise any appropriate number and type of caches, including but not limited to an instruction cache and a data cache. Branch prediction is handled by branch prediction logic 105. BTB/BHT 106 holds entries corresponding to branch instruction addresses that are used for branch prediction, and is discussed in further detail below with respect to FIGS. 3 and 4. Branch prediction logic 105 also determines, based on the confidence of a branch prediction made based on the information in BTB/BHT 106, whether to start a thread for an opposing path of a branch instruction. This determination may be made based on a confidence threshold that is predefined in branch prediction logic 105, and on a number of threads currently being handled by the SMT resources 103. The confidence threshold that is used by branch prediction logic 105 to determine whether to start an opposing path thread may comprise a variable confidence threshold in some embodiments; in such embodiments, the confidence threshold may be varied based on the number of parallel threads currently being handled by SMT resources 103. For example, if only the primary thread is currently executing, the confidence threshold may be relatively low, and as additional opposing threads start execution, the confidence threshold may be increased. Additionally, in some embodiments, a thread may have higher priority access to the resources of processor 101 during execution based on the predicted confidence associated with the thread and whether the thread is a primary or opposing thread. Branch prediction logic 105 may additionally initiate aborting of threads that are determined to be incorrect at branch resolution.

Figure 2:
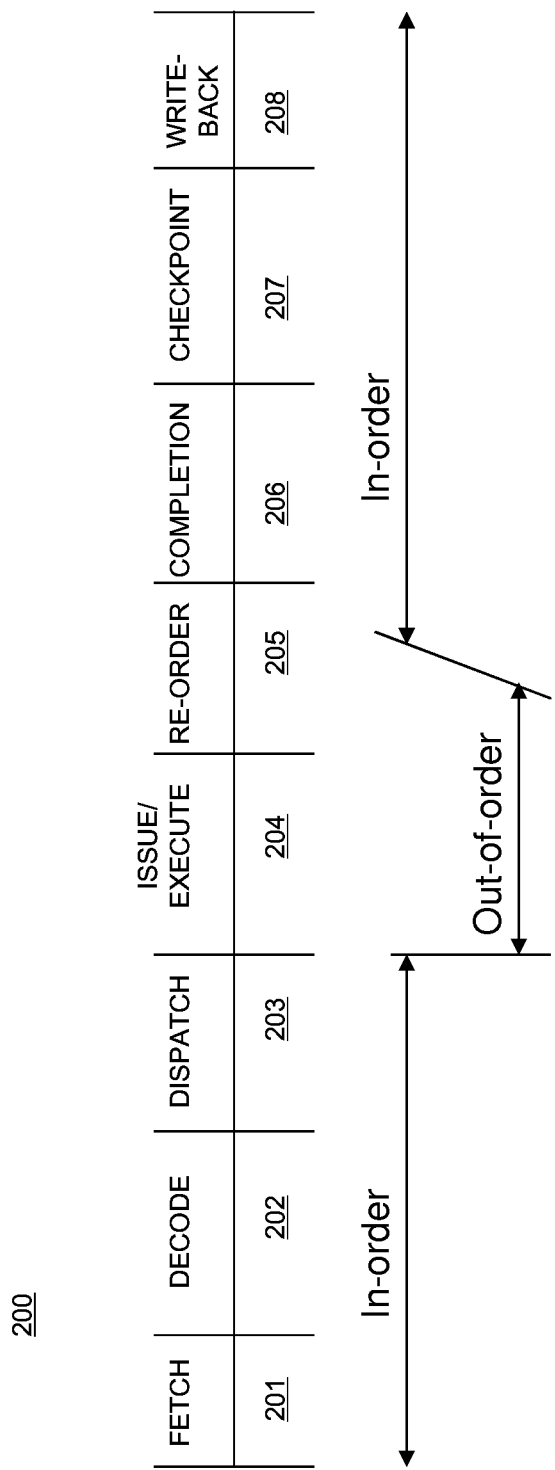
FIG. 2 depicts a pipeline in accordance with an embodiment.

FIG. 2 shows an illustrative embodiment of a pipeline 200 having a plurality of stages 201-208, which may comprise pipeline 102 of FIG. 1. Instructions proceed through the pipeline 200 from fetch stage 201 to write-back stage 208. During fetch, decode, and dispatch stages 201-203, instructions are processed in-order. During issue/execute stage 204, instructions may be executed out-of-order, as the data necessary to execute the instructions becomes available. The instructions are then reordered in reorder stage 205, and executed in-order during completion, checkpoint, and write-back stages 206-208. Branch prediction of a branch instruction may be performed in the front end of the pipeline, for example, during fetch stage 201, decode stage 202, or earlier, in various embodiments, and branch resolution of the branch instruction may occur during issue/execute stage 204. At checkpoint stage 207, it is determined whether an error (e.g., a transistor experienced an unexpected bit-flip) took place during execution of an instruction. If no error took place, the results of the instruction may be written into the cache storage 107 of the processor in write-back stage 208. FIG. 2 is shown for illustrative purposes only; a pipeline may have any appropriate number of stages in various embodiments.

Figure 3:
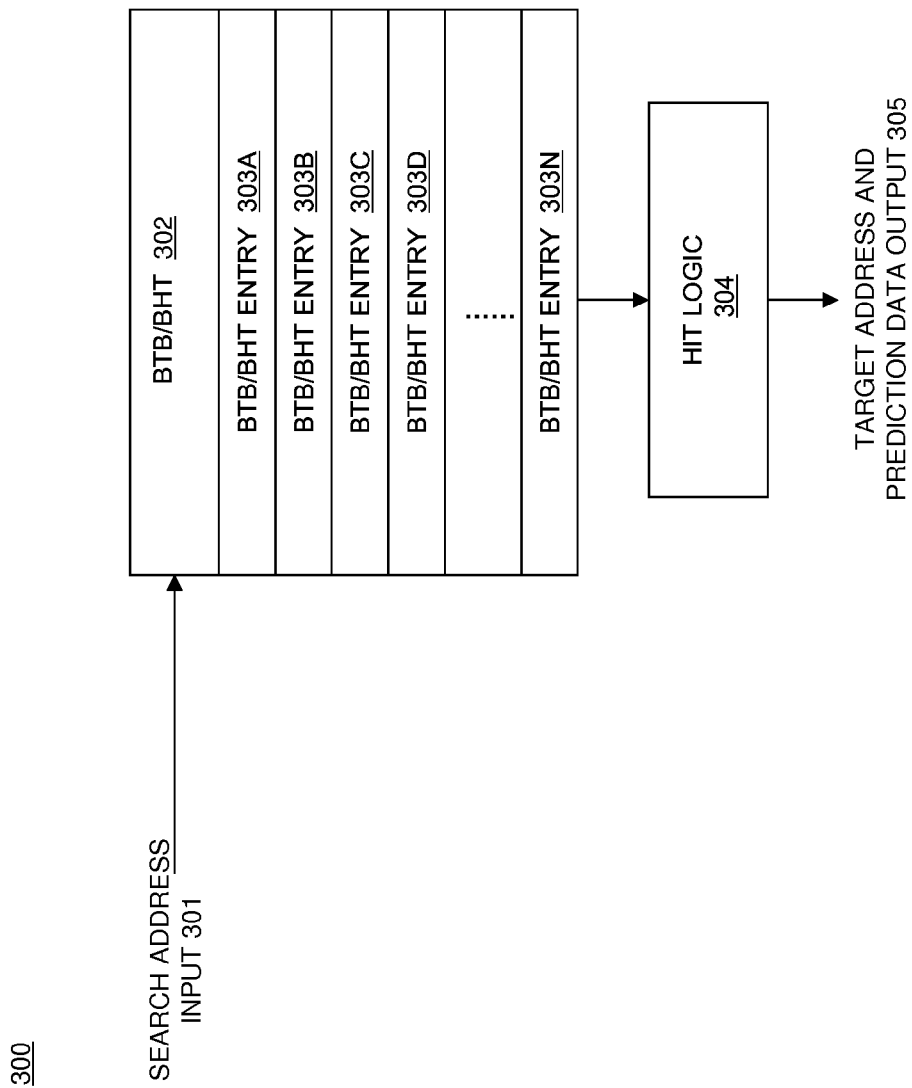
FIG. 3 depicts a branch target buffer/branch history table in accordance with an embodiment.

FIG. 3 illustrates an embodiment of a system 300 including a BTB/BHT 302, which may comprise BTB/BHT 106 of FIG. 1, and associated logic. BTB/BHT 302 that is shown in FIG. 3 comprises a fully associative BTB/BHT. A search address, comprising a branch instruction address, is received from branch prediction logic 105 on search address input 301 by the BTB/BHT 302, and it is determined whether any of entries 303A-N correspond to the search address received on search address input 301. If an entry, for example entry 303A, is determined to exist in BTB/BHT 302 that matches the search address, hit logic 304 determines and outputs a target address and prediction data from the entry 303A on target address and prediction output 305 to branch prediction logic 105. The prediction data may comprise a branch direction prediction, a target address prediction and confidence data, and is discussed in further detail below with respect to FIG. 4. FIG. 3 is shown for illustrative purposes only; a BTB/BHT may include any appropriate number of entries, and, in various embodiments, the entries may be organized into two or more congruence classes.

Figure 4:
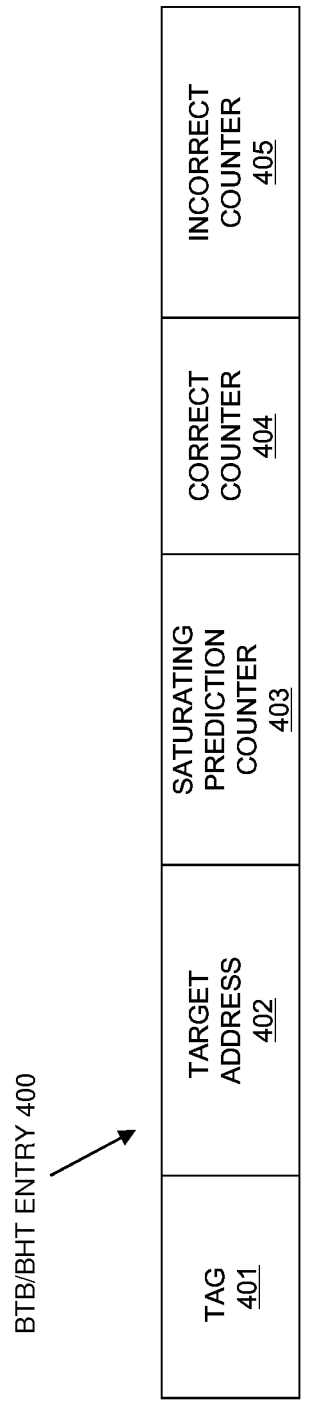
FIG. 4 depicts an entry for a branch target buffer/branch history table in accordance with an embodiment.

FIG. 4 illustrates an embodiment of a BTB/BHT entry 400, which may comprise each of BTB/BHT entries 303A-N as were shown in FIG. 3. BTB/BHT entry 400 includes a tag 401 that corresponds to an instruction address of a branch instruction; an entry of entries 303A-N is determined to match a particular search address received on search address input 301 if the tag 401 matches the search address. BTB/BHT entry 400 further includes a target address 402 that comprises an address of a target, i.e. next, instruction to be executed after the taken branch instruction corresponding to the entry 400. The saturating prediction counter 403 indicates whether the instruction corresponding to target address 402 is the predicted, or primary, path or non-predicted, or opposing, path. Saturating prediction counter 403 may comprise a 2-bit saturating counter in some embodiments; the saturating prediction counter 403 may comprise any appropriate counter that may be used for branch prediction and may be incremented and decremented in any appropriate manner.

Because SMT resources 103 for execution of additional threads in processor 101 are limited, only branch instructions having a confidence that is below the confidence threshold may start new opposing path threads. The correct counter 404 and incorrect counter 405 track the number of correct and incorrect predictions for the branch instruction corresponding to the entry 400, and are used to determine the confidence of the branch prediction that is given by saturating prediction counter 403. The confidence of the prediction given by saturating prediction counter 403 may be given by the value of the correct counter 404 divided by the sum of the value of the correct counter 404 and the value of the incorrect counter 405. If, at branch resolution of the branch instruction corresponding to the entry 400, the branch direction is determined to have been predicted correctly by saturating prediction counter 403, the correct counter 404 is incremented; if the branch direction is determined to have been predicted incorrectly, the incorrect counter 405 is incremented. Incrementing of the correct counter 404 or incorrect counter 405 and incrementing/decrementing of the saturating prediction counter 403 may be performed at any appropriate point in time after branch resolution of the branch instruction corresponding to the entry 400. The correct counter 404 and incorrect counter 405 may each comprise 4-bit counters in some embodiments, and if one of the correct/incorrect counters 404/405 saturates (i.e., reaches a maximum counter value), both counters 404/405 may be divided by two, shifting the counter values to the right by one bit and keeping the bits that were the most significant bits.

Figure 5A:
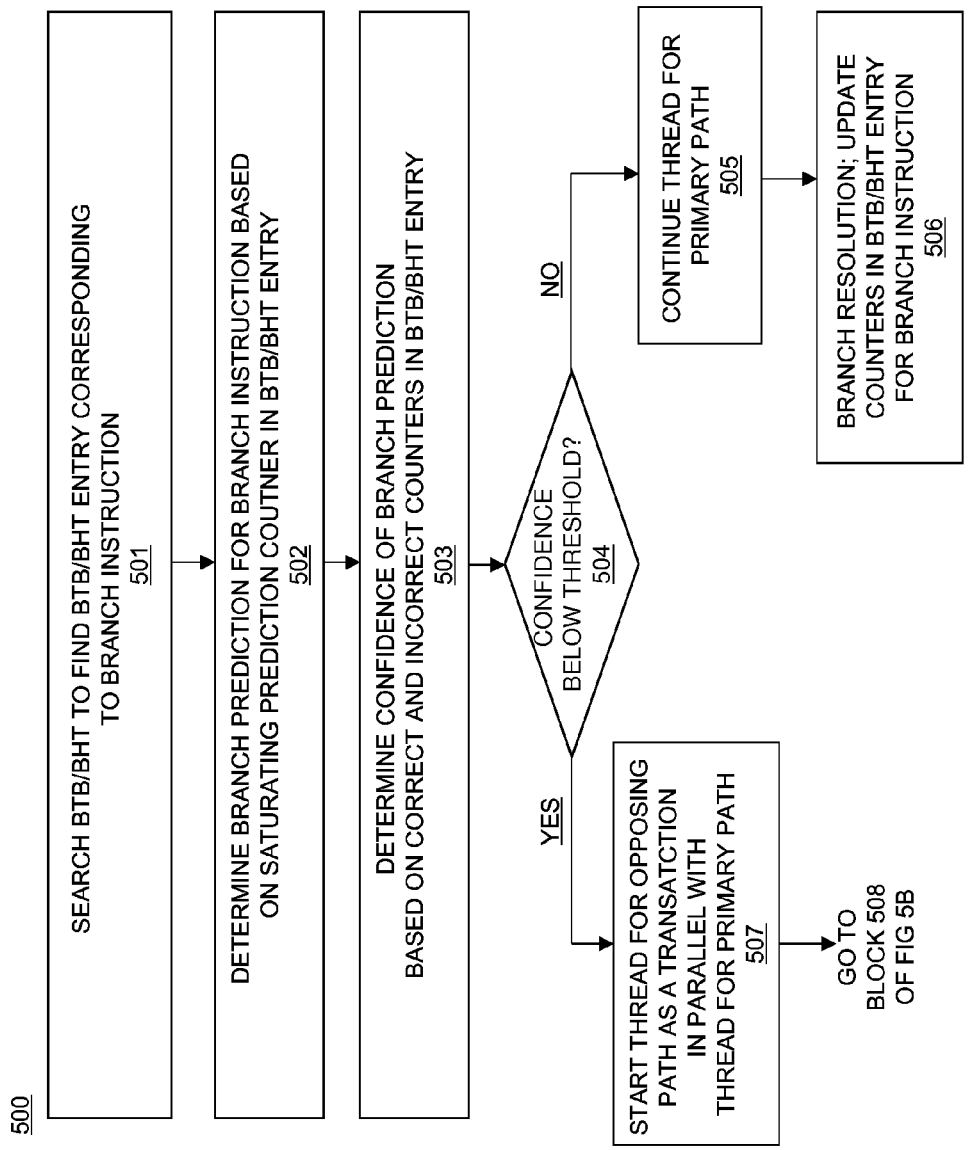
FIGS. 5A-B depict a process flow for confidence threshold-based opposing path execution for branch prediction in accordance with an embodiment.
Figure 5B:
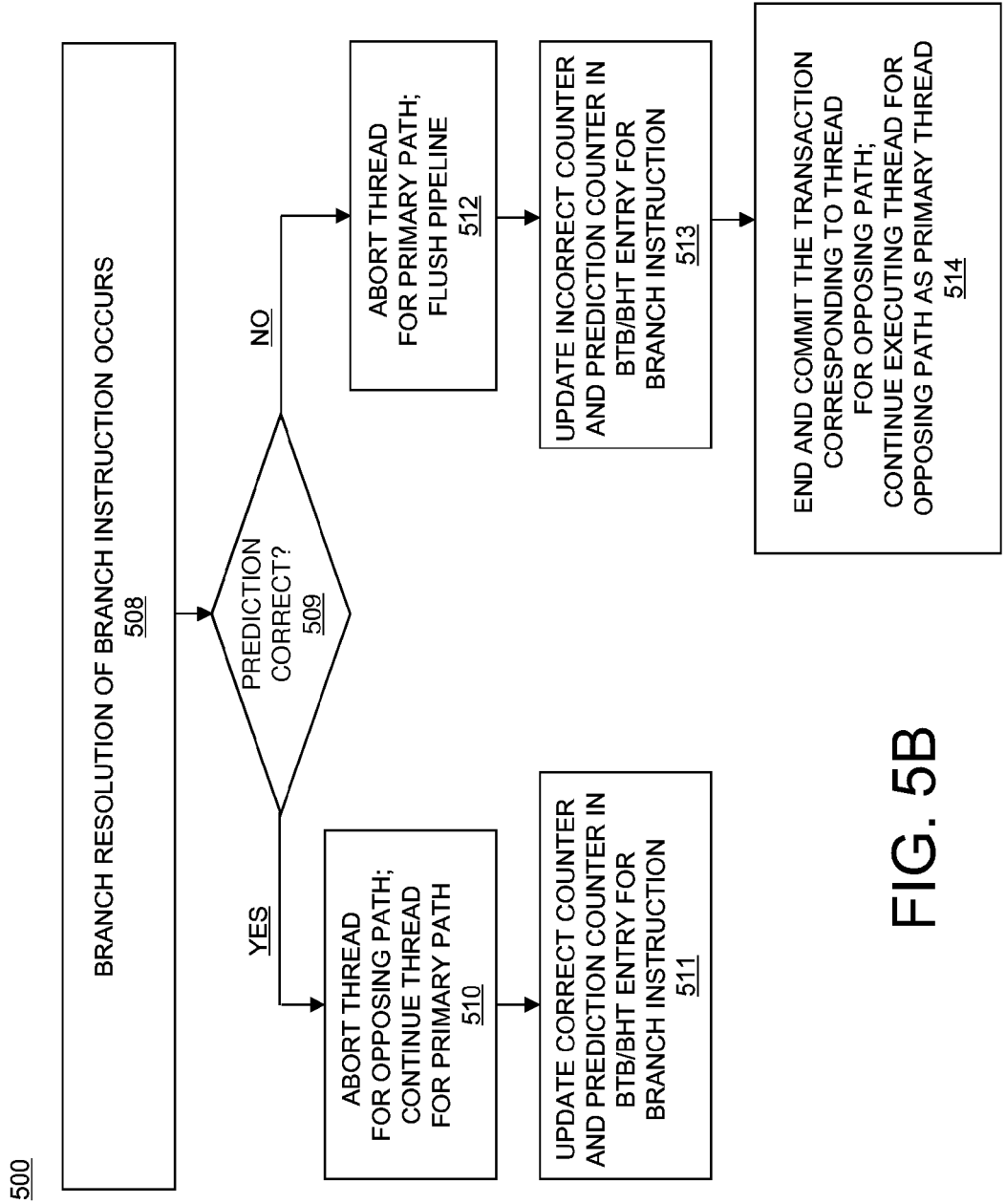

FIGS. 5A-B illustrate a flowchart of an embodiment of a method 500 for confidence threshold-based opposing path execution for branch prediction. Method 500 is discussed with reference to FIGS. 1-4. First, in block 501 of FIG. 5A, a branch instruction is encountered during execution of a main thread corresponding to a computer program, and the BTB/BHT 106/302 is searched for an entry having a tag 401 corresponding to an instruction address of the branch instruction. When a corresponding entry (for example, entry 303A/400) is determined in BTB/BHT 106/302, then, in block 502, a branch prediction is made for the branch instruction based on the saturating prediction counter 403 in the determined entry 303A/400. The saturating prediction counter 403 indicates whether the instruction corresponding to target address 402 is the predicted next instruction (i.e. taken). Next, in block 503, a confidence is determined for the branch prediction that was made in block 502 based on correct counter 404 and incorrect counter 405 by branch prediction logic 105. The confidence may be equal to the value of the correct counter 404 divided by the sum of the value of the correct counter 404 and the value of the incorrect counter 405. Next, flow proceeds to block 504, in which the confidence that was determined in block 503 is compared to a confidence threshold by branch prediction logic 105. The confidence threshold may have any appropriate value in various embodiments, and may comprise a variable confidence threshold in some embodiments. In such embodiments, the confidence threshold may be varied based on the number of parallel threads currently being handled by SMT resources 103.

If, in block 504, it is determined that the determined confidence is greater than the confidence threshold, flow proceeds to block 505, in which the main thread continues execution of the computer program down the primary path, as indicated by the prediction made in block 502. The primary path thread may either correspond to a next instruction that follows the not taken branch instruction corresponding to the entry 303A/400 in the computer program, or via a taken branch to the instruction corresponding to target address 402 defined in the entry 303A/400, depending on the branch prediction given by saturating prediction counter 403 in block 502. Then, when the primary path thread that is started in block 505 reaches branch resolution in block 506, it is determined whether the prediction made in block 502 was correct or not, and the counters in the BTB/BHT entry 303A/400 corresponding to the branch instruction are updated based on the branch resolution. If the prediction was correct, the correct counter 404 in the BTB/BHT entry 303A/400 corresponding to the branch instruction is incremented. If the prediction was incorrect, the pipeline 102 is flushed, and the incorrect counter 405 in the BTB/BHT entry 303A/400 corresponding to the branch instruction is incremented. The saturating prediction counter 403 is also updated to reflect the correct or incorrect branch prediction.

However, if in block 504, it is determined that the confidence of the branch prediction is less than the confidence threshold, flow proceeds from block 504 to block 507, in which the main thread continues execution corresponding to the primary path, and a new, parallel thread is started for the non-predicted (i.e., opposing) path by branch prediction logic 105. The opposing path thread may either correspond to a next sequential instruction that follows the branch instruction corresponding to the entry 303A/400 in the computer program, or to the instruction corresponding to target address 402 defined in the entry 303A/400, depending on the prediction given by saturating prediction counter 403 in block 502. The opposing path thread is handled by SMT resources 103. The set of instructions corresponding to the opposing path thread may be defined as a transaction using transactional memory 104, such that results of operations completed by the opposing path thread are stored in the transactional memory 104 until the branch completes.

Starting of the opposing path thread in block 507 may be subject to a number of threads currently being handled by the SMT resources 103 in processor 101, as the SMT resources 103 may have a maximum number of threads that can be handled at once. If the number of threads executing in the processor 101 is at this maximum number, the opposing path thread may not be started in block 507 in some embodiments. In other embodiments, the confidence that was determined in block 503 for the opposing path thread may be compared to the confidence of another, already existing, opposing path thread currently being executed by SMT resources 103, and if the current opposing path thread has a lower confidence than the already existing opposing path thread, the already existing opposing path thread may be aborted, and the current opposing path thread may be started in its place. The primary path thread may have a higher priority than the opposing path thread in some embodiments. Priority levels may also be assigned based on the confidence that was determined in block 503 in some embodiments.

From block 507 of method 500, flow proceeds to block 508 of FIG. 5B, in which branch resolution of the branch instruction corresponding to BTB/BHT entry 400/303A occurs in the pipeline 102/200, and the correct path for the branch instruction is known. Next, in block 509, it is determined whether the branch prediction made in block 502 for the branch instruction was correct based on the branch resolution of block 508. If it is determined in block 509 that the branch prediction was correct, flow proceeds to block 510, in which the branch prediction logic 105 causes the opposing path thread to be aborted. Aborting the opposing path thread may comprise rolling back the transaction corresponding to the opposing path thread by transactional memory 104. The primary path thread continues execution of the computer program. Lastly, in block 511, the correct counter 404 in the BTB/BHT entry 303A/400 corresponding to the branch instruction is incremented, and the saturating prediction counter 403 is also updated to reflect the correct branch prediction.

However, if it is determined in block 508 that the branch prediction made in block 502 for the branch instruction was incorrect based on the branch resolution of block 507, flow proceeds from block 509 to block 512, in which the branch prediction logic 105 causes the primary path thread to be aborted. Aborting the primary path thread may comprise flushing any instructions corresponding to the primary path thread in the pipeline 101/200 in some embodiments. Next, in block 513, the incorrect counter 405 in the BTB/BHT entry 303A/400 corresponding to the branch instruction is incremented, the saturating prediction counter 403 is also updated to reflect the incorrect branch prediction. Lastly, in block 514, the transaction corresponding to the opposing path thread is ended and committed from the transactional memory 104 to the cache storage 107, and the opposing path thread continues execution as the main thread for the computer program. The transaction may be committed after the branch reaches completion stage 206 in pipeline 102/200, as branch resolution is performed out-of-order, and completion is performed in-order. In some situations, it is possible for another thread corresponding to an older branch to get a branch prediction wrong and flush out this younger branch after the younger branch has reached branch resolution but before the younger branch has reached completion.

Aborting a thread, as is performed in blocks 510 and 512 of method 500 of FIGS. 5A-B, allows the portion of the SMT resources 103 that were devoted to the aborted thread to be restored to a free pool to be used to start an opposing path thread for a future low confidence branch prediction. Depending on the number of threads supported by the SMT resources 103 in the processor 101, additional opposing path threads may be started as transactions underneath the primary path thread or the opposing path thread. If a branch instruction having a prediction confidence below the confidence threshold is encountered in the primary or opposing path threads, additional opposing path threads may be started, up to the maximum number of threads supported by SMT resources 103, as is illustrated in FIG. 6.

Figure 6:
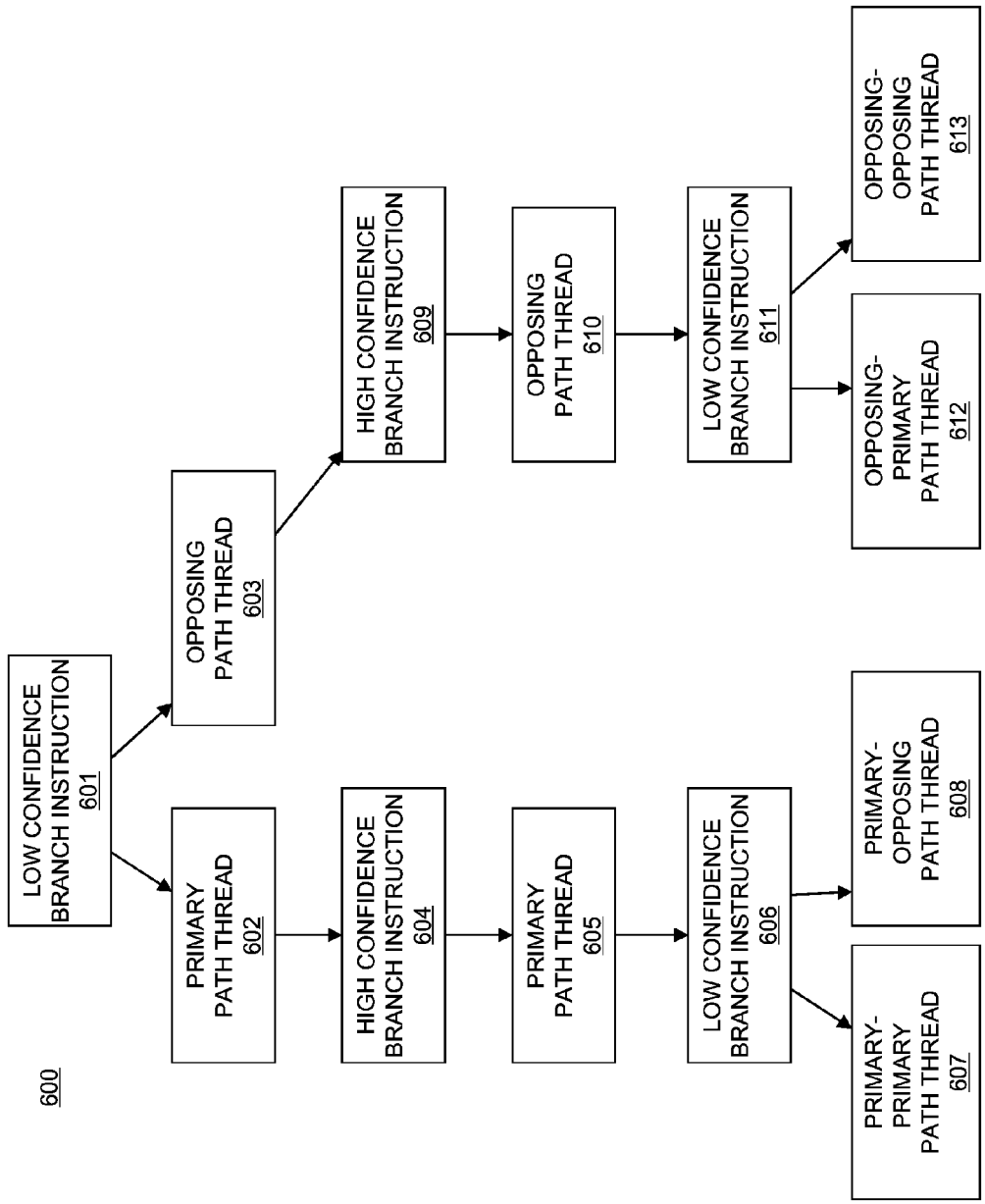
FIG. 6 depicts execution of confidence threshold-based opposing path execution for branch prediction in accordance with an embodiment.

FIG. 6 shows an example of execution of confidence threshold-based opposing path execution for branch prediction. The example of FIG. 6 executes on a processor having SMT resources with a maximum thread limit of 4. As shown in FIG. 6, a low confidence branch 601, having a confidence below the predefined confidence threshold, is encountered in during the execution of a program by a processor. The determination that the branch 601 is low confidence causes opposing path thread 603 to be started in parallel to primary path thread 602. Primary path thread 602 comprises the predicted path for low confidence branch instruction 601, and opposing path thread 603 comprises the non-predicted path. Opposing path thread 603 may be started as a transaction. Primary path thread 602 is the main thread for the program that contains low confidence branch instruction 601. During execution of the primary path thread 602, a high confidence branch instruction 604 is encountered, having a confidence that is greater than the confidence threshold. Because branch 604 is a high confidence branch instruction, primary path thread 602 continues execution as primary path thread 605 after encountering high confidence branch 604, and no opposing path thread is started for high confidence branch 604. Next, during further execution of primary path thread 602, another low confidence branch instruction 606 is encountered, which causes another primary-opposing path thread 608 to be started in parallel with primary-primary path thread 607. Primary-opposing path thread 608 may also be started as a transaction.

In execution of opposing path thread 603, which occurs in parallel to primary path thread 602, a high confidence branch instruction 609 is first encountered; opposing path thread 603 continues execution as opposing path thread 610 after high confidence branch instruction 609, and no additional opposing path thread is started. Then, during execution of opposing path thread 610, a low confidence branch instruction 611 is encountered, causing opposing-opposing path thread 613 to be started in parallel with opposing-primary path thread 612. Opposing-primary path thread 612 is a primary path with respect to opposing-opposing path thread 613. Opposing-opposing path thread 613 may also be started as a transaction. Primary-primary path thread 607, primary-opposing path thread 608, opposing-primary path thread 612, and opposing-opposing path thread 613 may all execute in parallel using SMT resources in the processor. The front end of the pipeline 102/200, including fetch stage 201, decode stage 202, and issue stage 204 may be equal for all of threads 607-608 and 612-613 in some embodiments; in other embodiments, some threads of threads 607-608 and 612-613 may be given higher priority access to the resources of pipeline 102/200 based on whether a particular thread is a primary thread and/or a confidence value associated with the thread. For example, a primary thread having a relatively high confidence may have a corresponding higher priority.

Because the SMT resources in the processor have a maximum thread limit of 4 in the example of FIG. 6, no additional threads may be started until one of these 4 threads is aborted. One of primary-primary path thread 607 and primary-opposing path thread 608 will be aborted at branch resolution of low confidence branch instruction 606; and one of opposing-primary path thread 612 and opposing-opposing path thread 613 will be aborted at branch resolution of low confidence branch instruction 611. Either primary-primary path thread 607 and primary-opposing path thread 608, or opposing-primary path thread 612 and opposing-opposing path thread 613, will be aborted at branch resolution of low confidence branch instruction 601.

In some embodiments, if an additional low confidence branch instruction is encountered in execution of any of primary-primary path thread 607, primary-opposing path thread 608, opposing-primary path thread 612, and opposing-opposing path thread 613, the confidence of the prediction for the additional low confidence branch instruction may be compared to the confidence of low confidence branch instructions 606 and 611, and if the additional low confidence branch instruction has a lower confidence than low confidence branch instructions 606 and 611, either primary-opposing path thread 608 or opposing-opposing path thread 613, respectively, may be aborted, and an opposing path for the additional low confidence branch instruction may be started in place of the aborted thread.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Referring now to FIG. 7, in one example, a computer program product 700 includes, for instance, one or more storage media 702, wherein the media may be tangible and/or non-transitory, to store computer readable program code means or logic 704 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Technical effects and benefits include increased processor efficiency in a computing system.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for confidence threshold-based opposing path execution for branch prediction, the method comprising:
   determining, by a processor of a computer, a branch prediction for a first branch instruction that is encountered during execution of a first thread, wherein the branch prediction indicates a primary path and an opposing path for the first branch instruction;
   executing the primary path by the first thread;
   determining a confidence of the branch prediction;
   comparing the confidence of the branch prediction to a confidence threshold;
   based on the confidence of the branch prediction being less than the confidence threshold, starting a second thread that executes the opposing path of the first branch instruction, wherein the second thread is executed in parallel with the first thread, wherein the second thread is started as a transaction that executes in a transactional memory of the processor;
   determining a branch resolution of the first branch instruction, wherein the branch resolution indicates whether one of the primary path and the opposing path comprises a correct path of the first branch instruction;
   based on the branch resolution of the first branch instruction indicating that the opposing path is the correct path of the first branch instruction, aborting the first thread;
   based on the branch resolution of the first branch instruction indicating that the primary path is the correct path of the first branch instruction, aborting the second thread;
   based on the branch resolution of the first branch instruction indicating that the opposing path is the correct path of the first branch instruction, ending and committing the transaction corresponding to the second thread; and
   based on the branch resolution of the first branch instruction indicating that the primary path is the correct path of the first branch instruction, rolling back the transaction corresponding to the second thread.

2. The method of claim 1, wherein the processor comprises a simultaneous multi-threaded (SMT) processor, and wherein starting the second thread is additionally based on a total number of threads currently being handled by the processor being less than a thread maximum of the SMT processor.

3. The method of claim 2, further comprising, based on the total number of threads currently being handled by the processor being equal to the thread maximum of the processor:
   determining a confidence of a branch prediction associated with a third thread that is currently executing in the processor, the third thread corresponding to an opposing path of a second branch instruction;
   comparing the confidence associated with the second branch instruction to the confidence associated with the first branch instruction; and
   based on the confidence associated with the second branch instruction being less than the confidence associated with the first branch instruction, aborting the third thread and starting the second thread that executes the opposing path of the first branch instruction.

4. A computer program product for implementing confidence threshold-based opposing path execution for branch prediction, the computer program product comprising:
   a non-transitory storage medium readable by a processor and storing instructions for execution by the processor for performing a method comprising:
      determining a branch prediction for a first branch instruction that is encountered during execution of a first thread, wherein the branch prediction indicates a primary path and an opposing path for the first branch instruction;
      executing the primary path by the first thread;
      determining a confidence of the branch prediction;
      comparing the confidence of the branch prediction to a confidence threshold;
      based on the confidence of the branch prediction being less than the confidence threshold, starting a second thread that executes the opposing path of the first branch instruction, wherein the second thread is executed in parallel with the first thread, wherein the second thread is started as a transaction that executes in a transactional memory of the processor;
      based on the branch resolution of the first branch instruction indicating that the opposing path is the correct path of the first branch instruction, ending and committing the transaction corresponding to the second thread; and
      based on the branch resolution of the first branch instruction indicating that the primary path is the correct path of the first branch instruction, rolling back the transaction corresponding to the second thread.

5. The computer program product of claim 4, wherein the processor comprises a simultaneous multi-threaded (SMT) processor, and wherein starting the second thread is additionally based on a total number of threads currently being handled by the processor being less than a thread maximum of the SMT processor.

6. The computer program product of claim 5, further comprising, based on the total number of threads currently being handled by the processor being equal to the thread maximum of the processor:
- determining a confidence of a branch prediction associated with a third thread that is currently executing in the processor, the third thread corresponding to an opposing path of a second branch instruction;
- comparing the confidence associated with the second branch instruction to the confidence associated with the first branch instruction; and
- based on the confidence associated with the second branch instruction being less than the confidence associated with the first branch instruction, aborting the third thread and starting the second thread that executes the opposing path of the first branch instruction.

* * * * *